United States Patent [19]

Abe et al.

[11] Patent Number: 5,182,336
[45] Date of Patent: Jan. 26, 1993

[54] THERMOPLASTIC RESIN COMPOSITION

[75] Inventors: Hiroomi Abe; Kenji Nagaoka; Taichi Nishio; Hideo Shinonaga; Takashi Sanada, all of Chiba, Japan

[73] Assignee: Sumitomo Chemical Company, Limited, Osaka, Japan

[21] Appl. No.: 624,304

[22] Filed: Dec. 7, 1990

[30] Foreign Application Priority Data

Dec. 27, 1989 [JP] Japan ................................. 1-341454

[51] Int. Cl.$^5$ ....................... C08L 71/12; C08L 77/00
[52] U.S. Cl. .................................... 525/132; 525/133; 525/391; 525/393; 525/396; 525/397; 525/905
[58] Field of Search ............... 525/132, 133, 391, 393, 525/396, 397, 905

[56] References Cited

U.S. PATENT DOCUMENTS

| | | | |
|---|---|---|---|
| 3,379,792 | 4/1968 | Finholt | 525/397 |
| 4,315,086 | 2/1982 | Ueno et al. | 525/391 |
| 4,543,378 | 9/1985 | Suhara et al. | 524/100 |
| 4,600,741 | 7/1986 | Aycock et al. | 524/139 |
| 4,654,405 | 3/1987 | Jalbert et al. | 525/391 |
| 4,659,760 | 4/1987 | van der Meer | 524/141 |
| 4,659,763 | 4/1987 | Gallucci et al. | 524/358 |
| 4,732,937 | 3/1988 | Sybert | 525/397 |
| 4,866,114 | 9/1989 | Taubitz et al. | 524/100 |

FOREIGN PATENT DOCUMENTS

| | | |
|---|---|---|
| 0046040 | 2/1982 | European Pat. Off. |
| 0236593 | 9/1987 | European Pat. Off. |
| 59-59724 | 4/1984 | Japan . |
| 59-86653 | 5/1984 | Japan . |
| 62-236853 | 10/1987 | Japan . |
| 63-108060 | 5/1988 | Japan . |
| 63-113071 | 5/1988 | Japan . |
| 1-139642 | 6/1989 | Japan . |
| 0132152 | 5/1990 | Japan . |
| 85/05372 | 12/1985 | World Int. Prop. O. |
| 87/00540 | 1/1987 | World Int. Prop. O. |
| 88/06173 | 8/1988 | World Int. Prop. O. |

Primary Examiner—James J. Seidleck
Assistant Examiner—Thomas Hamilton, III
Attorney, Agent, or Firm—Cushman, Darby & Cushman

[57] ABSTRACT

The present invention provides a thermoplastic resin composition which comprises:
  (i) at least one compatibilizing agent in an amount effective for compatibilization,
  (ii) (A) a polyphenylene ether in an amount of about 40-100% by weight based on the total amount of (A) and (B) and
  (B) a homopolymer of alkenyl aromatic compound or a random copolymer of alkenyl aromatic compound and unsaturated compound in an amount of 0-about 60% by weight based on the total amount of (A) and (B), the total amount of (A) and (B) being about 10% by weight or more based on total amount of all polymer components,
  (iii) at least one polyamide in an amount more than the amount required for forming a continuous phase, and
  (iv) a compound having a molecular weight of 2,000 or less, containing nitrogen element, and having ring opening or condensation polymerizability or reactivity with acid or amine.

14 Claims, No Drawings

THERMOPLASTIC RESIN COMPOSITION

The present invention relates to a thermoplastic resin composition which can be suitably utilized as three-dimensional shaped articles, sheets and the like, especially automobile parts and electric parts made by injection molding, extrusion molding and blow molding.

More particularly, the present invention relates to a novel thermoplastic resin composition excellent in processability and paintability which comprises at least one compatibilizing agent, a polyphenylene ether, at least one polyamide resin, and a reactive compound having a molecular weight of 2,000 or less and containing nitrogen element and, as optional components, an inorganic filler and an impact strength improver.

Resin compositions comprising polyphenylene ether and polyamide have been known for a long time and a composition comprising polyphenylene ether and at most 25% by weight of polyamide is disclosed in U.S. Pat. No. 3,379,792, but no compatibilizing agents for compatibilizing polyphenylene ether and polyamide are disclosed therein.

A liquid diene polymer, an epoxy compound and a compound having in the molecule both (a) carbon-carbon double bond or carbon-carbon triple bond and (b) carboxylic acid, acid anhydride, acid amide, imide, carboxylate ester, amino or hydroxyl group are disclosed as compatibilizing agents in U.S. Pat. No. 4,315,086. This patent further discloses as impact strength improvers ethylene propylene rubber, ethylene propylene polyene rubber or unsaturated carboxylic acid-modified products of these rubbers, SBR, polybutadiene, polystyrenediene rubber diblock or triblock copolymers or compositions with partial hydrides of these copolymers.

Processes for obtaining compositions by grafting unsaturated carboxylic acids on polyphenylene ether in the presence or absence of radical initiators and mixing the resulting graft polymer with polyamides are disclosed in Japanese Patent Kokai Nos. 59-59724 and 59-86653, U.S. Pat. No. 4,654,405 and International Patent Publication WO 87/00540.

Alkenyl aromatic compounds and α,β-unsaturated dicarboxylic acid anhydrides or their imide compounds are disclosed as compatibilizing agents for polyphenylene ether and polyamide in European Patent Publication EP-0046040.

Aliphatic polycarboxylic acids such as malic acid are disclosed in International Patent Publication WO 85/05372, oxidized polyethylene waxes are disclosed in U.S. Pat. No. 4,659,760, quinones are disclosed in U.S. Pat. No. 4,659,763. polyphenylene ethers made functional by epoxy compounds are disclosed in U.S. Pat. No. 4,732,937, and polyfunctional compounds comprising anhydrotrimellitic acid chloride are disclosed in U.S. Pat. No. 4,600,741 as compatibilizing agents for polyphenylene ether and polyamide. All of these compounds can be used in the present invention as compatibilizing agents.

Compositions comprising combination of compatibilizing agent, polyphenylene ether and crystalline polyamide with non-crystalline polyamide are disclosed in Japanese Pat. Kokai Nos. 63-108060 and 63-113071 and International Pat. Publication WO 88/06173.

Furthermore, compositions containing nitrogen-containing heterocyclic compounds or melamine as flame retardants are known in Japanese Pat. Kokai Nos. 62-236853 and 1-139642. However, resin compositions superior in paintability and other properties have not yet been developed.

Polyphenylene compositions have excellent mechanical properties and heat resistance, but have the defect that they are susceptible to discoloration when exposed to ultraviolet rays and sunlight. This defect is conspicuous especially in compositions comprising polyamide and polyphenylene ether and in general, molded articles of these compositions are painted for solving the defect or imparting decorative beautiful appearance and so compositions excellent in adhesion to coating have been demanded. However, conventional compositions comprising compatibilizing agent, polyphenylene ether and polyamide are not necessarily satisfactory in adhesion to coating and improvement of adhesion has been desired.

As a result of intensive research on various components conducted by the inventors, it has been found that compositions comprising a compatibilizing agent, polyphenylene ether and polyamide are markedly improved without damaging the excellent mechanical properties of the compositions by adding a small amount of a compound which has a molecular weight of 2,000 or less, contains nitrogen element and has ring opening or condensation polymerizability or has reactivity with acid or amine. Thus, the present invention has been accomplished.

That is, the present invention is a thermoplastic resin composition which comprises:

(i) at least one compatibilizing agent in an amount effective for compatibilization, (ii) (A) a polyphenylene ether in an amount of about 40–100% by weight based on the total amount of (A) and (B) and (B) a homopolymer of alkenyl aromatic compound or a random copolymer of alkenyl aromatic compound and unsaturated compound in an amount of 0-about 60% by weight based on the total amount of (A) and (B), the total amount of (A) and (B) being about 10% by weight or more based on total amount of all polymer components, (iii) at least one polyamide in an amount more than the amount required for forming a continuous phase, and (iv) a compound having a molecular weight of 2,000 or less, containing nitrogen element, and having ring opening or condensation polymerizability or reactivity with acid or amine.

The polyphenylene ether (ii) (A) is a polymer obtained by oxidation polymerization of at least one phenol compound represented by the formula:

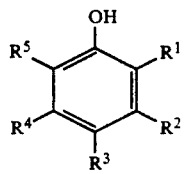

(wherein $R^1$, $R^2$, $R^3$, $R^4$ and $R^5$ which may be identical or different each represents a hydrogen atom, a hologen atom, a hydrocarbon group or a substituted hydrocarbon group and at least one of them is a hydrogen atom) with oxygen or a gas containing oxygen using an oxidation coupling catalyst.

Examples of $R^1$, $R^2$, $R^3$, $R^4$ and $R^5$ in the above formula are hydrogen atom, halogen atoms such as chlorine, fluorine, bromine, and iodine, and hydrocarbon groups or substituted hydrocarbon groups of 1-18 carbon atoms, for example, alkyl groups or substituted alkyl groups such as methyl, ethyl, n-propyl, isopropyl, pri-, sec- or t-butyl, chloroethyl, hydroxyethyl, phenylethyl, hydroxymethyl, carboxyethyl, methoxycarbonylethyl, and cyanoethyl, aryl groups or substituted aryl groups such as phenyl, chlorophenyl, methylphenyl, dimethylphenyl, and ethylphenyl, benzyl group and allyl group.

Examples of the phenol compounds shown by the above formula are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, and 2,3,5-, 2,3,6-, or 2,4,6-trimethylphenol, 3-methyl-6-t-butylphenol, thymol, and 2-methyl-6-allylphenol. Further, the phenol compounds may be copolymers of the compounds of the above formula and other phenol compounds, for example, polyhydric hydroxy aromatic compounds such as bisphenol A, tetrabromobisphenol A, resorcin, hydroquinone, and novolak resins.

Among them, preferred are homopolymers of 2,6-dimethylphenol or 2,6-diphenylphenol or copolymers of major part of 2,6-dimethylphenol and minor part of 3-methyl-6-t-butylphenol or 2,3,6-trimethylphenol.

Any oxidation coupling catalysts can be used for oxidation polymerization of the phenol compounds as far as they have polymerization ability. Typical examples thereof are catalysts comprising cuprous salt and tert. amine such as cuprous chloridetriethylamine and cuprous chloride-pyridine; catalysts comprising cupric salt-amine and alkali metal hydroxide such as cupric chloride-pyridinepotassium hydroxide; catalysts comprising manganese salt and primary amine such as manganese chlorideethanolamine and manganese acetate-ethylenediamine; catalysts comprising manganese salt and alcoholate or phenolate such as manganese chloride-sodium methylate and manganese chloride-sodium phenolate; catalysts comprising cobalt salt and tert. amine.

Oxidation polymerization temperature for obtaining polyphenylene ether is 40° C. or higher (high temperature polymerization) or lower (low temperature polymerization). Either temperature may be used, although polymers produced thereby have different properties.

At least one polyamide (iii) used in the present invention is at least one polyamide selected from crystalline aliphatic polyamides and aromatic polyamides.

The crystalline aliphatic polyamides used in the present invention include, for example, the following.

They have a molecular weight of 10,000 or more and can be produced by bonding equimolar of a saturated aliphatic dicarboxylic acid containing 4-12 carbon atoms and an aliphatic diamine containing 2-12 carbon atoms. In this case, if necessary, the diamine may be used so as to provide more amine terminal groups than carboxyl terminal groups in the polyamide, or alternatively, a dibasic acid may be used so as to provide more acid groups. Similarly, these polyamides can be produced from the above acid and acid production derivatives and amine production derivatives such as esters, acid chlorides and amine salts of the above mentioned acids and amines.

Typical examples of the aliphatic dicarboxylic acids used for production of the polyamides include adipic acid, pimelic acid, azelaic acid, suberic acid, sebacic acid and dodecanedioic acid. Typical examples of the aliphatic diamines include hexamethylenediamine and octamethylenediamine. Besides, these polyamides can also be produced by self-condensation of lactam.

Examples of the polyamides are polyhexamethylene adipamide (nylon 66), polyhexamaethylene azelamide (nylon 69), polyhexamethylene sebacamide (nylon 610), polyhexamethylene dodecanoamide (nylon 612), poly-bis-(p-aminocyclohexyl)methane dodecanoamide, polytetramethylene adipamide (nylon 46) and polyamides produced by ring cleavage of lactam such as polycaprolactam (nylon 6) and polylauryl lactam. Furthermore, there may be used polyamides produced by polymerization of at least two amines or acids used for production of the above mentioned polymers, for example, polymers produced from adipic acid, sebacic acid and hexamethylenediamine The polyamides further include blends of polyamides such as a blend of nylon 66 and nylon 6 including copolymers such as nylon 66/6.

Preferably, these crystalline polyamides used in the present invention are nylon 46, nylon 6, nylon 66, nylon 11 and nylon 12. More preferred are nylon 6, nylon 66 and blends of nylon 66 and nylon 6 at optional blending ratio.

Furthermore, those which have terminal functional groups excess in amine terminal groups, excess in carboxyl terminal groups or balanced in these groups, or mixtures of them at optional ratio can be suitably used.

The aromatic polyamides used in the present invention are copolyamides containing an aromatic component therein, for example, polyhexamethylene isophthalamide (nylon 6I). The thermoplastic copolyamides containing aromatic component means melt-polymerizable polyamides containing as a main component an aromatic amine acid and/or an aromatic dicarboxylic acid such as para aminoethylbenzoic acid, para-aminoethylbenzoic acid, terephthalic acid, and isophthalic acid.

Diamines which may constitute another component of the polyamide include hexamethylenediamine, undecamethylenediamine, dodecamethylenediamine, 2,2,4-/2,4,4-trimethylhexamethylenediamine, m-xylylenediamine, p-xylylenediamine, bis(p-aminocyclohexyl)methane, bis(p-aminocyclohexyl)propane, bis(3-methyl-4-aminocyclohexyl)methane, 1,3-bis-(aminomethyl)cyclohexane, and 1,4-bis(aminomethyl)-cyclohexane. An isocyanate may also be used in place of the diamine. Examples of the isocyanate are 4,4'-diphenylmethane diisocyanate and tolylene diisocyanate.

Comonomers which are used, if necessary, have no limitation and examples of the comonomers are a unit of lactam, a unit of $\omega$-amino acid of 4-12 carbon atoms, a compound derived from an aliphatic dicarboxylic acid of 4-12 carbon atoms and an aliphatic diamine of 2-12 carbon atoms, for example, lactams and amino acids such as $\epsilon$-caprolactam, $\omega$-laurolactam, 11-aminoundecanoic acid, and 12-aminododecanoic acid, and equimolar salts of the above-mentioned various diamines and adipic acid, azelaic acid or sebacic acid.

Typical example of the thermoplastic aromatic copolyamides comprising these components are copolymer polyamide of p-aminomethylbenzoic acid and $\epsilon$-caprolactam (nylon AMBA/6), polyamides mainly composed of 2,2,4-/2,4,4-trimethylhexamethylenediamine. terephthalate (nylon TMDT and Nylon TMDT/6I), polyamide mainly composed of hexamethylene diamine. isophthalate and/or hexamethylenediamine.terephthalate and containing, as a comonomer, bis(p-aminocyclohexyl)methane.isophthalate and/or bis(p-aminocyclohexyl) methane.terephthalate, bis(3-methyl-4-aminocyclohexyl)methane.isophthalate and/or bis(3-methyl-4-aminocyclohexyl)methane.terephthalate or bis(p-aminocyclohexyl)propane.isophthalate and/or bis(p-aminocyclohexyl)propane.terephthalate (nylon 6I/PACM I, nylon 6I/DMPACM I, nylon 6I/PACP I, nylon 6I/6T/PACM I/PACM T, nylon 6I/6T/ DMPACM I/DMPACM T, nylon 6I/6T/PACP I/PACP T), polyamide mainly composed of hexamethylenediamine.isophthalate or hexamethylenediamine.terephthalate and containing, as a comonomer, ε-caprolactam, 12-aminododecanoic acid, hexamethylenediamine.adipate, bis(p-aminocyclohexyl)methane.adipate or bis(3-methyl,4-aminocyclohexyl)methane.adipate (nylon 6I, 6I/6T, 6I/12,6T/6, 6T/66, 6I/PACM 6, 6I/DMPACM 6), and polyamides mainly composed of bis(p-aminocyclohexyl)methane.isophthalate or bis(3-methyl,4-aminocyclohexyl)methane.isophthalate and containing, as a comonomer, hexamethylenediamine.dodecanedioate or 12-aminododecanoic acid (nylon PACM I/612, nylon DMPACM I/12).

Of these aromatic polyamides, non-crystalline aromatic polyamides are suitable.

Compounds (iv) used in the present invention which have a molecular weight of 2,000 or less, contain nitrogen atom and have ring opening or condensation polymerizability or reactivity with acid amine are those of the following group.

(a) Lactams and derivatives thereof
(b) Diamines and derivatives thereof
(c) Diisocyanates and derivatives thereof
(d) Triazines and derivatives thereof Examples of the compounds are shown below.

(a) Lactams and derivatives thereof:

Lactams such as ε-caprolactam, ω-laurolactam, 11-aminoundecanoic acid, 12-aminododecanoic acid, glycocyamidine, oxindol, isatin, and cyclic ureide, and derivatives thereof such as low molecular weight oligomers and metallic salts thereof.

(b) Diamines and derivatives thereof:

Diamines such as hexamethylenediamine, undecamethylenediamine, dodecamethylenediamine, 2,2,4-/2,4,4-trimethylhexamethylenediamine, m-xylylenediamine, p-xylylenediamine, bis(p-aminocyclohexyl)methane, bis(p-aminocyclohexyl)propane, bis(3-methyl,4-aminocyclohexyl)methane, 1,3-bis(aminomethyl)cyclohexane, and 1,4-bis(aminomethyl)cyclohexane, and derivatives thereof such as salts of these diamines with dicarboxylic acids.

(c) Diisocyanates and derivatives thereof:

Tolylene diisocyanate, diphenylmethane diisocyanate and polymers thereof, naphthalene diisocianate, tolidine diisocyanate, triphenylmethane triisocyanate, tris(isocyanatophenyl) thiophosphate, p-phenylene diisocyanate, hexamethylene diisocyanate, xylylene diisocyanate, isophorone diisocyanate, bis(isocyanatomethyl)cyclohexane, dicyclohexylmethane diisocyanate, lysine diisocyanate, trimethylhexamethylene diisocyanate, 2-chloroethyl isocyanate, chloroacetyl isocyanate, 4-chlorobenzenesulfonyl isocyanate, 3,4-dichlorophenyl isocyanate, 2-isocyanatobenzoyl chloride, chlorosulfonyl isocyanate, N-(chlorocarbonyl) isocyanate, 2,4-difluorophenyl isocyanate, 4-fluoro-3-nitrophenyl isocyanate, 2-fluorophenyl isocyanate, 2-chlorophenyl isocyanate, 3-fluorophenyl isocyanate, 3-chlorophenyl isocyanate, 4-fluorophenyl isocyanate, 4-chlorophenyl isocyanate, and 3-fluorosulfonylphenyl isocyanate.

(d) Triazines and derivatives thereof:

Compounds represented by the formula (I):

(wherein X, Y, and Z each represents $R_1$ or $NR_2R_3$ in which $R_1$, $R_2$ and $R_3$ each represents a hydrogen atom, an alkyl group, an aryl group or a substituent represented by the formula (II):

where $R_4$ represents a hydrogen atom or an alkyl or a cycloalkyl group of 1-10 carbon atoms).

Examples of the compounds are melamine(2,4,6-triamino-1,3,5-triazine), various methylolmelamines of from monomethylolmelamine to hexamethylolmelamine, etherified melamines prepared by modifying various methylolamines with monohydric alcohols, guanamine various methylolguanamines of from monomethylolguanamine to hexamethylolguanamine, etherified guanamines prepared by modifying various methylolguanamines with monohydric alcohols, ammelide, ammeline, guanylmelamine, cyanomelamine, arylguanamines, melam, melem, and mellon.

In the present invention, adhesion to coating can be markedly improved by adding at least one compound selected from the groups of (a)-(d). Addition amount of the compound is preferably 0.01-10% by weight, more preferably 0.05-2% by weight as the amount present in the composition. If the amount is more than 10% by weight, impact resistance lowers much and if it is less than 0.01% by weight, adhesion to coating is not improved.

(ii) (B) Homopolymers of alkenyl aromatic compounds or random copolymers of alkenyl aromatic compounds and unsaturated compounds include, for example, polystyrene, poly-p-methylstyrene, styrene-α-methylstyrene copolymer, polyvinyltoluene, styrenealkyl (meth)acrylate copolymer and styrene-glycidyl (meth)acrylate copolymer.

In the present invention, inorganic filler and/or impact strength improver can be used as additional components. The inorganic filler is preferably at least one selected from talc, kaolin, mica,titanium oxide, clay, magnesium hydroxide, potassium titanate whisker and glass fiber. These may be used singly or in combination.

Amount of the inorganic filler is preferably 1-70 parts by weight per 100 parts by weight of the resin composition composed of (i), (ii), (iii) and (iv).

As the impact strength improver, various organic polymer materials used as impact resistance improver for polyamide, polyphenylene ether, polystyrene, polyolefin, and the like can be used singly or in combination. Many of them are disclosed in U.S. Pat. No. 4,315,086, International Patent Publication WO/85/05372, and European Patent Publication EP 0236593.

As examples of them, mention may be made of diblock copolymers, triblock copolymers, and radial teleblock copolymers of styrene and conjugated diene, and partial hydrides thereof as the first group.

These are marketed under trademarks of KRATON® D and DRATON® G by Shell Chemical Co. and SOLPRENE® by philips Petroleum Co. and are easily available.

The second group includes homopolymers and random copolymers of conjugated diene monomers.

Examples of the second group are polyisoprene, polybutadiene, styrene-butadiene copolymer, isopreneisobutylene copolymer, butadiene-acrylbnitrile random copolymer, and polyoctenylene, and graft copolymers of these polymers grafted with styrene and/or unsaturated compounds having polar group such as acrylic acid, methacrylic acid, maleic anhydride and fumaric acid and derivatives thereof, glycidyl (meth)acrylate, acrylamide, and N-methylolacrylamide.

The third group includes non-polar olefinic polymers. Examples thereof are ethylene-propylene rubber (EPM), ethylene-propylene-polyene rubber (EPDM), ethylene-butene rubber, ethylene-butenepolyene rubber, propylene-butene rubber, polyisobutylene, and linear low-density polyethylene, and graft copolymers of these polymers grafted with styrene, acrylonitrile and/or unsaturated compounds having polar group such as acrylic acid, methacrylic acid, maleic anhydride and fumaric acid and derivatives thereof, glycidyl (meth)acrylate, acrylamide, and N-methylolacrylamide.

The fourth group includes copolymers of ethylene and unsaturated compounds having polar group. Examples of them are ethylene-alkyl (meth)acrylate copolymers, ethylene-alkyl (meth)acrylate-maleic anhydride copolymer, ethylene-(meth)acrylic acid copolymer, ethylene-glycidyl (meth)acrylate copolymer, ethylene-glycidyl (meth)acrylate-alkyl (meth)acrylate copolymer, and ethylene-glycidyl (meth)acrylate-vinyl acetate copolymer, and ionomers derived from these copolymers.

It is also possible to use the impact strength improvers of the first group to the fourth group in any combination of two or more.

The compatibilizing agent (i) used for compatibilization of polyphenylene ether and polyamide in the present invention has no special limitation, but is suitably at least one compatibilizing agent selected from the following groups (1)-(10).

(1) Liquid diene polymers.

(2) Epoxy compounds having no ethylenically or acetylenically unsaturated bond.

(3) compounds having in the same molecule both (a) at least one unsaturated group, namely, carbon-carbon double bond or carbon-carbon triple bond and (b) at least one polar group.

(4) Oxidized polyolefin waxes.

(5) Quinones.

(6) Silane compounds having in molecular structure both (a) at least one silicon atom bonded to carbon atom through crosslinkage of oxygen and (b) at least ethylenic carbon-carbon double bond or carbon-carbon triple bond and/or a functional group selected from amino group and mercapto group, said functional group being not bonded directly to silicon atom.

(7) Compounds having, in the same molecule, (a) —OR) (wherein R is hydrogen, an alkyl group, an aryl group, an acyl group, or a carbonyldioxy group) and (b) at least two same or different functional group selected from carboxylic acid, acid halid, acid anhydride, anhydroacid halid, acid ester, acid amide, imide, amino and salts thereof.

(8) Compounds having, in the same molecule, (a) acid halide group and (b) at least one of carboxylic acid, carboxylic anhydride, acid ester and acid amide groups.

Furthermore, those of the following groups (9) and (10) are also included in the compatibilizing agents which can be used in the present invention as one embodiment.

(9) Polyphenylene ethers made functional which are obtained by previously allowing polyphenylene ether to react with at least one compatibilizing agent selected from the groups (1)-(3) and (5)-(8).

(10) Compositions obtained by melt kneading at least one compatibilizing agent selected from the groups (1)-(8), polyphenylene ether and a small amount of polyamide.

Compatibilizing agents of group (1) include, for example, homopolymers of conjugated diene and copolymers of one conjugated diene and other conjugated diene or vinyl monomer, namely, styrene, ethylene, propylene or the like which have a number-average L molecular weight of 150-10000, preferably 150-5000. Examples thereof are polybutadiene, polyisoprene, poly(butylene/isoprene). and poly(styrene/butadiene).

As compatibilizing agents of group (2), mention may be made of ①  condensates of polyhydric phenols (such as bisphenol A, tetrabromobisphenol A, and resorcin) and epichlorohydrin and ② condensates of polyhydric alcohols (such as ethylene glycol, propylene glycol, and polyethylene glycol) and epichlorohydrin.

Compatibilizing agents of group (3) are compounds having in the same molecule both an unsaturated group, namely, a carbon-carbon double bond or a carbon-carbon triple bond and a polar group, namely, a functional group having affinity for or chemical reactivity with amide bond contained in polyamide resin and carboxyl group or amino group present at terminal of chain. Examples of such functional groups are carboxylic acid group, groups derived from carboxylic acid, namely, carboxyl groups whose hydrogen or carboxyl group is substituted such as various salts and esters, acid amide, acid anhydride, imide, acid azide, and acid halide groups, oxazoline group, nitrile group, epoxy group, amino group, hydroxyl group, and isocyanate ester group. As these compounds having both the unsaturated group and polar group, there may be used unsaturated carboxylic acids, unsaturated carboxylic acid derivatives, unsaturated epoxy compounds, unsaturated alcohols, unsaturated amines, and unsaturated isocyanate esters.

Examples of the compounds are maleic anhydride, maleic acid, fumaric acid, maleimide, maleic acid hydrazide, reaction products of maleic anhydride and diamines, for example, compounds having the formulas:

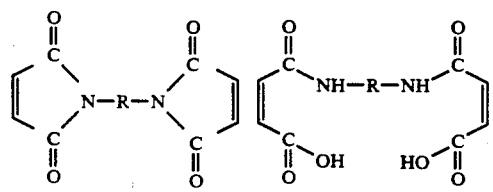

(wherein R is an aliphatic or aromatic group), methylnadic anhydride, dichloromaleic anhydride, maleic acid amide, itaconic acid, itaconic anhydride, natural fats and oils such as soybean oil, tung oil, caster oil, linseed oil, hempseed oil, cottonseed oil, sesame oil, rapeseed oil, peanut oil, camellia oil, olive oil, coconut oil, and sardine oil; epoxidized natural fats and oils such as epoxidized soybean oil; unsaturated carboxylic acids such as acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4 pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid 9-octadecenoic acid, eicosenoic acid, docosenoic acid, erucic acid, tetracocenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linolic acid, linolenic acid, octadecatrienoic acid, eicosadienoic acid, eicosatrienoic acid, eicosatetraenoic acid, ricinoleic acid, eleostearic acid, oleic acid, eicosapentaenoic acid, erucinic acid, docosadienoic acid, docosatrienoic acid, docosatetraenoic acid, docosapentaenoic acid, tetracosenoic acid, hexacosenoic acid, hexacodienoic acid, octacosenoic acid, and triacontenoic acid; and esters, acid amides and anhydrides of these unsaturated carboxylic acids; unsaturated alcohols such as allyl alcohol, crotyl alcohol, methylvinyl carbinol, allyl carbinol, methylpropenyl carbinol, 4-pentene-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohols represented by the formulas $C_nH_{2n-5}OH$, $C_nH_{2n-7}OH$, $C_nH_{2n-9}OH$ (n is a positive integer), 3-butene-1,2-diol, 2,5-dimethyl-3-hexene-2,5-diol, 1,5-hexadiene-3,4-diol, and 2,6-octadiene-4,5-diol and unsaturated amines such as ones where an OH group of these unsaturated alcohols is replaced by an —$NH_2$ group, glycidyl (meth)acrylate and allylglycidyl ether.

Moreover, low polymers (e.g., 500–10,000 in average molecular weight) or high polymers (e.g., at least 10000 in average molecular weight) of butadiene, isoprene, etc. to which maleic anhydride or phenols are added or into which amino group, carboxylic acid group, hydroxyl group, epoxy group, or the like is introduced, and allyl isocyanate.

It is a matter of course that the definition of the compound having both unsaturated group and polar group in the same molecule includes compounds having two or more unsaturated groups and two or more polar groups (which may be identical or different) and furthermore, it is also possible to use two or more of the compounds.

Among them, preferred are maleic anhydride, maleic acid, fumaric acid, itaconic anhydride, itaconic acid, and glycidyl (meth)acrylate and more preferred are maleic anhydride and fumaric acid.

The compatibilizing agents of group (4) are usually prepared by oxidation of polyolefin wax in the air or in suspension and polyethylene wax is preferred.

The compatibilizing agents of group (5) are compounds having quinone structure and examples thereof are 1,2- and 1,4-benzoquinone, 2,6-diphenylquinone, and 2-chloro-1,4-benzoquinone.

The compatibilizing agents of group (6) are silane compounds having, in molecular structure, both (a) at least one silicon atom bonded to carbon atom through crosslinkage of oxygen and (b) at least ethylenic carbon-carbon double bond or carbon-carbon triple bond and/or functional group selected from amino group and mercapto group, said functional group being not directly bonded to silicon atom. Examples are γ-aminopropyltriethoxysilane and 2-(3-cyclohexyl)ethyltrimethoxysilane.

The compatibilizing agents of group (7) are aliphatic polycarboxylic acids, acid esters or acid amides and are represented by the formula:

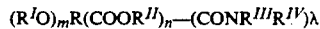

(wherein R is a linear or branched saturated aliphatic hydrocarbon having 2–20, preferably 2–10 carbon atoms; $R^I$ is a hydrogen atom or an alkyl, aryl, acyl or carbonyldioxy group having 1–10, preferably 5 1–6, more preferably 1–4 carbon atoms and is most preferably hydrogen atom; $R^{II}$ is a hydrogen atom or an alkyl or aryl group having 1–20, preferably 1–10 carbon atoms; $R^{III}$ and $R^{IV}$ are independently a hydrogen atom or an alkyl or aryl group of 1–10, preferably 1–6, more preferably 1–4 carbon atoms; m is 1, (n+λ) is 2 or more, preferably 2 or 3, n and λ are each 0 or more than 0; ($OR^I$) is at α- or β-position in respect to carbonyl group and at least two carbonyl groups are isolated by 2–6 carbon atoms; and carbon atom number of each of $R^I$, $R^{II}$, $R^{III}$, and $R^{IV}$ is less than 6, it is obvious that they are not aryl groups.

Examples of these polycarboxylic acids are malic acid, malic acid and agaricic acid. Anhydrides and hydrates of these polycarboxylic acid may also be used. Examples of the acid esters are acetyl citrate and mono- or di-stearyl citrate.

Examples of the acid amides are N,N'-diethylcitric acid amide and N-dodecylcitric acid amide.

Furthermore, derivatives of the polycarboxylic acids, especially salts thereof can also be suitably used.

The compatibilizing agents of group (8) are compounds having in the same molecule at least one acid halide group, most preferably acid chloride group and at least one of carboxylic acid group, carboxylic acid anhydride group, acid ester group and acid amide group, peferably carboxylic acid group or acid anhydride group.

Examples of these compounds are trimellitic acid chloride and anhydrotrimellitic acid chloride.

Compatibilizing agent (i) can attain the object of the present invention in an amount effective to carry out compatibilization, but amount of the compatibilizing agent (i) is preferably 0.01–20 parts by weight based on 100 parts by weight of (ii) and (iii). If it is less than 0.01 part by weight, the effect is small and if it is more than 20 parts by weight, further increase in effect is not obtained.

Total amount of (ii) polyphenylene ether and random copolymer of vinyl cyanide compound and alkenyl aromatic compound and homopolymer of alkenyl aromatic compound or random copolymer of alkenyl aromatic compound and unsaturated compound is preferably 10–95 parts by weight per 100 parts by weight of (ii) and (iii). If it is outside this range, inherent properties of the composition such as impact strength cannot be obtained.

Further, amount of (iii) at least one polyamide is preferably 90–5 parts by weight per 100 parts by weight of (ii) and (iii). When it is outside this range, inherent properties of the composition such as impact strength cannot be obtained.

The thermoplastic resin composition of the present invention can be produced by melt kneading these components (i), (ii), (iii) and (iv).

The melt kneading method has no special limitation and the composition can be produced by simultaneously kneading these components by single or twin screw extruder or the like.

Preferable melt kneading method comprises previously melt kneading compatibilizing agent (i) and polyphenylene ether (ii), then adding thereto polyamide (iii) and compound (iv) having a molecular weight of 2,000 or less, containing nitrogen element and having ring opening or condensation polymerizability or reactivity with acid or amine, and further melt kneading them.

The following nonlimiting examples illustrates some embodiments of the present invention. The mixing ratios are all % by weight unless otherwise notified.

Izod impact strength in the following examples and comparative examples was measured in accordance with JIS K7110 (thickness 3.2 mm with notch) at room temperature.

Evaluation of paintability was conducted in the following manner: Composition of examples and comparative examples was molded into a plate of 150×150×3 mm at 290° C. and this plate was used for evaluation. As paint, ORIGIN PLATE ZNY (black) (manufactured by Origin Denki Co.) was used and painted at a thickness of about 25μ by a painting gun ordinary conditions and the painted plate was dried in an oven at 70° C. for 30 minutes. After lapse of 1 hr, 2 hr, 5 hr, 12 hr, and 24 hour from drying, the plate was subjected to adhesive cellophane tape peeling test (A cellophane tape was allowed to adhere to the plate, then this was cut cross to form 100 squares of about 2 mm width, and thereafter the cellophane tape was peeled and percentage of remaining squares was obtained) to evaluate adhesive.

Impact strength improvers used in the examples and comparative examples were obtained by the following methods.

Preparation Example A (preparation of maleic anhydride-modified styrene grafted EPR)

100 parts by weight of EPR (ethylene-propylene copolymer, ESPRENE ® E-120P manufactured by Sumitomo Chemical Co., Ltd.), 1.5 part by weight of styrene monomer, 1.5 part by weight of maleic anhydride, and 0.1 part by weight of a free radical initiator, namely, dicumyl peroxide (DCP manufactured by Nippon Oil & Fats Co., Ltd.) were previously well mixed using Henschel mixer, and then extruded by twin-screw extruder (TEX 44 manufactured by Nippon Steel Works Co., Ltd.). Cylinder temperature was set at 230° C. and screw speed was set at 190 rpm.

Preparation Example B (Preparation of styrene grafted EPDM)

100 g of ethylene-propylene-ethylidenenorbornene terpolymer (ESPRENE ® E-502 manufactured by Sumitomo Chemical Co., Ltd.) ground to particles of less than 5 mm edge and 350 g of water were charged in a 1.0λ glass autoclave and with stirring thereto were added a solution prepared by dissolving 0.65 g of benzoyl peroxide in 30 g of styrene and a solution prepared by dissolving 4.0 g of polyvinyl alcohol (GOSENOL ® GL-05 manufactured by Nippon Synthetic Chemical Industry Co., Ltd.) in 100 g of water as a dispersion stabilizer in this order, followed by stirring for 1 hour to impregnate the ethylenepropylene-ethylidenenorbornene terpolymer with the solutions. Then, reaction was allowed to proceed for 6 hours at 90° C. and for 2 hours at 115° C. After completion of the reaction, the reaction product was filtrated, washed with water and vacuum dried to obtain 127 g of styrene grafted EPDM.

Preparation Example C (Preparation of styreneacrylonitrile grafted EPDM)

100 g of ethylene-propylene-ethylidenenorbornene terpolymer (ESPRENE ® E-502 manufactured by Sumitomo Chemical Co., Ltd.) ground to particles of less than 5 mm edge and 350 g of water were charged in a 1.0λ glass autoclave and with stirring thereto were added a solution prepared by dissolving 0.65 g of benzoyl peroxide in 25 g of styrene and 5 g of acrylonitrile and a solution prepared by dissolving 4.0 g of polyvinyl alcohol used in Preparation Example B in 100 g of water as a dispersion stabilizer in this order, followed by carrying out impregnation and reaction under the same conditions as in Preparation Example B.

After completion of the reaction, the reaction product was filtrated, washed with water and vacuum dried to obtain 125 g of styrene-acrylonitrile grafted EPDM.

EXAMPLE 1

Polyphenylene ether manufactured by Nippon Polyether Co. (having a reduced viscosity of 0.54 dl/g measured in chloroform of 0.5 g/dl at 25° C.; hereinafter referred to as "PPE-A"), a hydrogenated styrene-butadiene-styrene block copolymer (KRATON ® G-1651 manufactured by Shell Chemical Co.; hereinafter referred to as "SEBS") and fumaric acid as a compatibilizing agent were dry blended and the mixture was fed from the first hopper of a twinscrew kneader (TEM-50 manufactured by Toshiba Machine Co., Ltd.) and polyamide (UNITIKA NYLON 6 ® A1030BRL) and ε-caprolactam as a paintability improver were introduced from the second hopper between the first hopper and vent hole and these were kneaded. That is, 100 parts by weight of a mixture of PPE-A 40 wt %, SEBS 10 wt % and polyamide 50 wt %, and 0.5 part by weight of fumaric acid and 0.5 part by weight of ε-caprolactam were kneaded and granulated. Kneading conditions were cylinder temperature 260° C. and screw speed 330 rpm. The resulting composition was dried and a plate of 150×150×3 mm and a test piece for Izod impact test were molded therefrom by an injection molding machine (Toshiba IS-220EN). Molding conditions were set temperature 290° C. and mold temperature 80° C. Results of evaluation of paintability and Izod impact strength are shown in Table 1.

EXAMPLE 2

Example 1 was repeated except that styrene-acrylonitrile grafted EPDM (shown in Preparation Example C, hereinafter referred to as "St-AN-g-EPDM") was used in place of SEBS and 1.0 part by weight of ω-laurolactam was used in place of ε-caprolactam as a paintability improver.

EXAMPLE 3

Example 1 was repeated except that 0.8 part by weight of melamine was used in place of ω-caprolactam as paintability improver.

COMPARATIVE EXAMPLE 1

Example 1 was repeated except that the paintability improver was not used.

EXAMPLE 4

Example 1 was repeated except that the paintability improver was introduced not from the second hopper, but from the first hopper.

EXAMPLE 5

Example 1 was repeated except that polyamide and paintability improver were not introduced from the second hopper, but introduced from the first hopper together with PPE-A, SEBS and fumaric acid.

COMPARATIVE EXAMPLE 2

Example 1 was repeated except that compatibilizing agent was not introduced.

EXAMPLE 6

Example 1 was repeated except that PPE-B (reduced viscosity in chloroform : 0.46 dl/g) was used in place of PPE-A, styrene-butadiene-styrene block copolymer (CALIFLEX ® TR1101 manufactured by Shell Chemical Co.; hereinafter referred to as "SBS") was used in place of SEBS, 0.5 part by weight of maleic anhydride was used in place of fumaric acid as compatibilizing agent, 45 wt % of nylon 6 A1030BRL and 5 wt % of nylon 66 A100 (MARANYL ® A100 manufactured by ICI) were used in place of 50 wt % of polyamide nylon 6 A1030BRL, and 0.4 part by weight of hexamethylolmelamine was used in place of $\epsilon$-caprolactam.

EXAMPLE 7

Example 6 was repeated except that 11-aminoundecanoic acid was used as paintability improver.

EXAMPLE 8

Example 6 was repeated except that hexamethylenediamine was used as paintability improver.

EXAMPLE 9

Example 6 was repeated except that diphenylmethane diisocyanate was used as paintability improver.

COMPARATIVE EXAMPLE 3

Example 6 was repeated except that paintability improver was not used.

EXAMPLE 10

45 wt % of PPE-B, 10 wt % of styrene grafted EPDM (shown in Preparation Example B; hereinafter referred to as "St-g-EPDM"),and 0.5 part by weight of fumaric acid (based on 100 parts by weight of PPEB, St-g-EPDM, and polyamide component) as compatibilizing agent were introduced from the first hopper and 45 wt % of polyamide (nylon 6, A1030BRL) and 0.6 part by weight of guanamine (based on 100 parts by weight of PPE-B, St-g-EPDM, and polyamide component) as paintability improver were introduced from the second hopper. The resulting composition was evaluated in the same manner as in Example 1.

EXAMPLE 11

Example 10 was repeated except that 10 wt % of St-AN-g-EPDM was used in place of St-g-EPDM, 0.5 part by weight of maleic anhydride was used in place of fumaric acid, and 0.2 part by weight of $\epsilon$-caprolactam was used as paintability improver.

COMPARATIVE EXAMPLE 4

Example 10 was repeated except that 10 wt % of maleic anhydride modified styrene grafted EPR (shown in Preparation Example A; hereinafter referred to as "m-EPR") was used in place of St-g-EPDM and 12 parts by weight of melamine was used as paintability improver.

EXAMPLE 12

Comparative Example 4 was repeated except that 45 wt % of PPE A was used in place of PPE-B, 0.6 part by weight of citric acid was used in place of maleic anhydride as compatibilizing agent, and 0.4 part of $\epsilon$-caprolactam was used in place of 12 parts of melamine as paintability improver.

EXAMPLE 13

Example 10 was repeated except that 45 wt % of PPE-A was used in place of PPE-B, 10 wt % of ESPRENE EMA ® 3601 (manufactured by Sumitomo Chemical Co., Ltd.; hereinafter referred to as "EMA") was used in place of St-g-EPDM, 45 wt % of nylon 66 (A100) was used in place of nylon 6 (A1030BRL) as polyamide, and 0.2 part by weight of melamine was used as paintability improver.

COMPARATIVE EXAMPLE 5

Example 13 was repeated except that paintability improver was not used.

EXAMPLE 14

Example 10 was repeated except that hydrogenated styrene-isoprene block copolymer (KRATON G ® 1701 manufactured by Shell Chemical Co.) was used in place of St-g-EPDM and 3.0 parts by weight of $\epsilon$-caprolactam was used as paintability improver.

EXAMPLE 15

50 wt % of PPE-B and 0.5 part by weight of maleic anhydride (based on 100 parts by weight of PPE-B and polyamide component) as compatibilizing agent were introduced from the first hopper and 50 wt % of polyamide (nylon 6 A1030BRL) and 0.5 part by weight of $\epsilon$-caprolactam (based on 100 parts by weight of PPE-B and polyamide component) as paintability improver were introduced from the second hopper and the resulting product was evaluated on paintability in the same manner as in Example 1.

COMPARATIVE EXAMPLE 6

Example 15 was repeated except that paintability improver was not used.

EXAMPLE 16

45 wt % of PPE-B and 0.5 part by weight of maleic anhydride (based on 100 parts by weight of PPE-B, polyamide and SBS component) as compatibilizing agent were introduced from the first hopper and 45 wt % of polyamide (nylon 6 A1030 BRL), 10 wt % of SBS and 0.5 part by weight of e-caprolactam (based on 100 parts by weight of PPE-B, polyamide and SBS component) as paintability improver were introduced from the second hopper and the resulting product was evaluated on paintability and Izod impact strength in the same manner as in Example 1.

Results obtained in these Examples and Comparative Examples are shown in Tables 1-3.

As is clear from Tables 1-3, according to the present invention, film adhesion can be improved by adding specific paintability improver. Futher more, resin compositions having good impact resistance with improving film adhesion can be obtained by introducing PPE and compatibilizing agent from the first hopper and paintability improver from the second hopper to carry out multi-stage kneading.

TABLE 1

|  | Example 1 | Example 2 | Example 3 | Comparative Example 1 | Example 4 | Example 5 | Comparative Example 2 |
|---|---|---|---|---|---|---|---|
| The First Hopper | | | | | | | |
| PPE-A $\eta_{SP/C} = 0.51$ | 40 | 40 | 40 | 40 | 40 | 40 | 40 |
| B $\eta_{SP/C} = 0.46$ | | | | | | | |
| Impact strength improver | SEBS 10 | St-AN-g-EPDM 10 | SEBS 10 | SEBS 10 | SEBS 10 | SEBS 10 Nylon 6 50 | SEBS 10 |
| Compatibilizing agent | Fumaric acid 0.5 | Fumaric acid 0.5 | Fumaric acid 0.5 | Fumaric acid 0.5 | Fumaric acid 0.5 | Fumaric acid 0.5 | — |
| Paintability improver | — | — | — | — | Melamine 0.8 | Melamine 0.8 | Melamine 0.8 |
| The second Hopper | | | | | | | |
| Nylon 6 | 50 | 50 | 50 | 50 | 50 | — | 50 |
| Paintability improver | ε-caprolactam 0.5 | ω-Laurolactam 1.0 | Melamine 0.8 | — | — | — | — |
| Adhesion to coating film | | | | | | | |
| 1 hr | 8 | 7 | 11 | 0 | 0 | 0 | 0 |
| 2 hr | 25 | 26 | 28 | 0 | 0 | 0 | 0 |
| 5 hr | 74 | 67 | 71 | 23 | 39 | 33 | 25 |
| 12 hr | 96 | 91 | 89 | 37 | 62 | 61 | 38 |
| 24 hr | 99.9 | 99 | 99.5 | 60 | 82 | 79 | 61 |
| Izod Impact | 51 | 45 | 49 | 50 | 21 | 11 | 31 |

TABLE 2

|  | Example 6 | Example 7 | Example 8 | Example 9 | Comparative Example 3 | Example 10 | Example 11 |
|---|---|---|---|---|---|---|---|
| The first hopper | | | | | | | |
| PPE-A $\eta_{SP/C} = 0.51$ | | | | | | | |
| B $\eta_{SP/C} = 0.46$ | 40 | 40 | 40 | 40 | 40 | 45 | 45 |
| Impact strength improver | SBS 10 | SBS 10 | SBS 10 | SBS 10 | SBS 10 | St-g-EPDM 10 | St-AN-g-EPDM 10 |
| Compatibilizing agent | Maleic anhydride 0.5 | Maleic anhydride 0.5 | Maleic anhydride 0.5 | Maleic anhydride 0.5 | Maleic anhydride 0.5 | Fumaric acid 0.5 | Maleic anhydride 0.5 |
| Paintability improver | | | | | | | |
| The second hopper | | | | | | | |
| Nylon 6 | 45 | 45 | 45 | 45 | 45 | 45 | 45 |
| Nylon 66 | 5 | 5 | 5 | 5 | 5 | | |
| Impact strength improver | | | | | | | |
| Paintability improver | Hexamethylolmelamine 0.4 | 11-Aminoundecanoic acid 1.5 | Hexamethylene diamine 0.5 | Diphenylmethane diisocyanate 1.0 | — | Guanamine 0.6 | ε-Caprolactam 0.2 |
| Adhesion to coating film | | | | | | | |
| 1 hr | 26 | 41 | 19 | 6 | 0 | 13 | 21 |
| 2 hr | 44 | 65 | 51 | 38 | 0 | 37 | 52 |
| 5 hr | 81 | 87 | 75 | 67 | 35 | 53 | 87 |
| 12 hr | 93 | 98 | 92 | 90 | 51 | 72 | 98 |
| 24 hr | 99.5 | 99.8 | 99 | 98 | 76 | 97 | 99.9 |
| Izod Impact | 42 | 38 | 33 | 34 | 40 | 42 | 46 |

TABLE 3

|  | Comparative Example 4 | Example 12 | Example 13 | Comparative Example 5 | Example 14 | Example 15 | Comparative Example 6 | Example 16 |
|---|---|---|---|---|---|---|---|---|
| The first hopper | | | | | | | | |
| PPE-A $\eta_{SP/C} = 0.51$ | | 45 | 45 | 45 | | | | |
| B $\eta_{SP/C} = 0.46$ | 45 | | | | 45 | 50 | 50 | 45 |
| Impact strength improver | m-EPR 10 | m-EPR 10 | EMA rubber 10 | EMA rubber 10 | SEP 10 | | | |
| Compatibilizing agent | Maleic anhydride 0.5 | Citric acid 0.6 | Fumaric acid 0.5 | Fumaric acid 0.5 | Fumaric acid 0.5 | Maleic anhydride 0.5 | Maleic anhydride 0.5 | Maleic anhydride 0.5 |
| Paintability improver | | | | | | | | |
| The second hopper | | | | | | | | |

TABLE 3-continued

|  | Comparative Example 4 | Example 12 | Example 13 | Comparative Example 5 | Example 14 | Example 15 | Comparative Example 6 | Example 16 |
|---|---|---|---|---|---|---|---|---|
| Nylon 6 | 45 | 45 |  |  |  | 50 | 50 | 45 |
| Nylon 66 |  |  | 45 | 45 | 45 |  |  |  |
| Impact strength improver |  |  |  |  |  |  |  | SBS 10 |
| Paintability improver | Melamine 12 | ε-Capro-lactam 0.4 | Melamine 0.2 |  | ε-Capro-lactam 3.0 | ε-Capro-lactam 0.5 |  | ε-Capro-lactam 0.5 |
| Adhesion to coating film |  |  |  |  |  |  |  |  |
| 1 hr | 0 | 0 | 24 | 0 | 12 | 34 | 0 | 23 |
| 2 hr | 0 | 13 | 57 | 18 | 35 | 72 | 25 | 61 |
| 5 hr | 0 | 25 | 78 | 41 | 61 | 81 | 47 | 89 |
| 12 hr | 12 | 46 | 93 | 63 | 87 | 98 | 63 | 98 |
| 24 hr | 31 | 82 | 99.9 | 79 | 99.1 | 100 | 81 | 99.9 |
| Izod Impact | 9 | 42 | 42 | 41 | 37 | — | — | 75 |

According to the present invention, it has been found that thermoplastic resin compositions comprising polyphenylene ether, polyamide, compatibilizing agent and impact strength improver can be remarkably improved in paintability, especially adhesion in a short time after painting by adding thereto a compound having a molecular weight of 2,000 or less, containing nitrogen element and having ring opening or condensation polymerizability. Thus, paintability which is one of the problems of compositions of polyphenylene ether and polyamide can be solved and the compositions have a wide variety of uses.

The novel resin compositions provided by the present invention can be easily processed into shaped products, sheets and films by processing method used for thermoplastic resin compositions such as injection molding and extrusion molding. The thus obtained products have very good balance in properties such as impact resistance, heat resistance and flexural rigidity and besides are superior in paintability. The compositions are especially suitable for being processed by injection molding.

We claim:

1. A thermoplastic resin composition which comprises:
   (i) at least one compatibilizing agent in an amount effective for compatibilization,
   (ii) (A) a polyphenylene ether in an amount of about 40–100% by weight based on the total amount of (A) and (B) and
   (B) a homopolymer of alkenyl aromatic compound or a random copolymer of alkenyl aromatic compound and unsaturated compound in an amount of about 60% by weight or less based on the total amount of (A) and (B), the total amount of (A) and (B) being about 10% by weight or more based on total amount of all polymer components,
   (iii) at least one polyamide in an amount more than the amount required for forming a continuous phase, and
   (iv) lactam or derivative thereof having a molecular weight of 2,000 or less and having ring opening or condensation polymerizability or reactivity with acid or amine, in an amount of 0.05–2% by weight based on the total amount of the components (i), (ii) and (iii).

2. A resin composition according to claim 1, wherein said compatibilizing agent (i) is at least one compatibilizing agent selected from the following groups (1)–(10):
   (1) liquid diene polymers,
   (2) epoxy compounds having neither ethylenic unsaturated bond nor acetylenic unsaturated bond,
   (3) compounds having in the same molecule both (a) at least one unsaturated group selected from the group consisting of carbon-carbon double bond and carbon-carbon triple bond and (b) at least one polar group,
   (4) oxidized polyolefin waxes,
   (5) quinones
   (6) silane compounds having in molecular structure both (a) at least one silicon atom bonded to carbon atom through crosslinkage of oxygen and (b) at least one ethylenic carbon-carbon double bond or carbon-carbon triple bond and/or a functional group selected from amino group and mercapto group, said functional group being not directly bonded to silicon atom,
   (7) compounds having, in the same molecule, (a) (—OR) wherein R is hydrogen, an alkyl group, an aryl group, acyl group, or a carbonyldioxy group and at least two same or different functional groups selected from the group consisting of carboxylic acid group, acid halide group, acid anyhydride group, anhydroacid halide group, acid ester group, acid amide group, imide group, amino group, and salts thereof,
   (8) compounds having, in the same molecule, (a) acid halide group and (b) at least one of carboxylic acid group, and (b) at least one of carboxylic group, carboxylic anhydride group, acid ester group and acid amide group,
   (9) polyphenylene ethers made functional by at least one compatabilizing agent selected from the groups (1)–(3) and (5)–(8), and
   (10) compositions obtained by melt kneading at least one compatibilizing agent selected from the groups (1)–(8), polyphenylene ether and a small amount of polyamide.

3. A resin composition according to claim 1, wherein the alkenyl aromatic compound in (ii) is at least one compound selected from the group consisting of styrene, vinyltoluene and α-methylstyrene.

4. A resin composition according to claim 1, wherein the polyamide (iii) is at least one crystalline aliphatic polyamide.

5. A resin composition according to claim 4, the crystalline aliphatic polyamide is at least one polyamide selected from the group consisting of polyamide 46, polyamide 6, polyamide 66, polyamide 11, polyamide 12 and polyamide 6/10.

6. A resin composition according to claim 5, wherein the crystalline aliphatic polyamide comprises about 30-about 95% by weight of polyamide and about 70- about 5% by weight of complementary polyamide 66 based on total amount of aliphatic polyamides.

7. A resin composition according to claim 1, wherein the polyamide (iii) is a mixture of at least one crystalline aliphatic polyamide and at least one aromatic polyamide.

8. A resin composition according to claim 7, wherein the polyamide comprises about 70-about 99.5% by weight of at least one crystalline aliphatic polyamide selected from polyamide 46, polyamide and polyamide 66 and about 30-about 0.5% by weight of aromatic polyamide based on total amount of polyamides.

9. A resin composition according to claim 1, wherein polyphenylene ether (ii) is at least one selected from the group consisting of poly(2,6-dimethyl 1,4-phenylene) ether and 2,6-dimethyl phenol-2,3,6-trimethyl phenol copolymer.

10. A resin composition according to claim 1, which contains about 1-70 parts by weight of an inorganic filler based on 100 parts by weight of the resin composition.

11. A resin composition according to claim 10, wherein the inorganic filler is at least one inorganic filler selected from the group consisting of talc, titanium oxide, clay, magnesium hydroxide, potassium titanate whisker and glass fiber.

12. A resin composition according to claim 11, wherein the inorganic filler is combination of talc and glass fiber.

13. A resin composition according to claim 14, which contains about 1-50 parts by weight of a impact strength improver based on 100 parts by weight of the resin composition.

14. A thermoplastic resin composition which comprises:
(i) at least one compatibilizing agent in an amount effective for compatibilization,
(ii) (A) a polyphenylene ether in an amount of about 40-100% by weight based on the total amount of (A) and (B) and
(B) a homopolymer of alkenyl aromatic compound or a random copolymer of alkenyl aromatic compound and unsaturated compound in an amount of about 60% by weight or less based on the total amount of (A) and (B), the total amount of (A) and (B) being about 10% by weight or more based on total amount of all polymer components,
(iii) at least one polyamide in an amount more than the amount required for forming a continuous phase, and
(iv) $\epsilon$-caprolactam in an amount of 0.05-2% by weight based on the total amount of the components (i), (ii) and (iii).

* * * * *